United States Patent Office 3,018,267
Patented Jan. 23, 1962

3,018,267
COMPOSITION AND PROCESS FOR BINDING GLASS FIBERS WITH AN UNSATURATED POLYESTER, POLY-N-VINYL IMIDAZOLE AND A VINYL MONOMER
Robert Steckler, Chagrin Falls, Ohio, and Jesse Werner, Holliswood, N.Y., assignors to General Aniline & Film Corporation, New York, N.Y., a corporation of Delaware
No Drawing. Filed Mar. 11, 1958, Ser. No. 720,566
6 Claims. (Cl. 260—45.4)

The present invention relates to the thermosetting resinous compositions having excellent adhesion to glass and fibrous glass materials.

The reaction of polyhydric alcohols with polybasic acids produces a very well known class of resinous materials which are called polyester resins. When at least part of these alcohols, or acids, contain one or more double bonds, the resulting polyester is capable of cross-linking with other unsaturated materials through the reactive double bonds, thereby forming three dimensional cross-linked structures, which are characteristic of thermosetting resins. The polybasic acids and polyhydric alcohols used in these preparations of polyesters can all be unsaturated, or a blend of unsaturated and saturated materials can be used. These variations permit the preparation of a large number of unsaturated polyesters with a wide range of properties. The preparation of these resins is well known and described in detail in the literature, patents and text books.

Various polymerizable monomers have been suggested, such as, for example, styrene, vinyl toluene, methyl methacrylate, diallyl phthalate, diallyl fumarate, vinyl acetate, vinyl chloride, acrylic acid and derivatives, vinyl phenols, etc. as cross-linking agents with an unsaturated polyester. The principal disadvantage of such monomers, when mixed with polyester resins, and then cured, is that the resulting cured resin has poor adhesion to glass cloth, glass fibres and the like. If glass cloths or glass fibers are impregnated with such resins, and built into laminates, followed by curing, they do not exhibit the desired flexural strength and modulus.

It is an object of this invention to overcome the foregoing difficulties and provide a new thermosetting resinous composition, having the property, when cured, of yielding improved adhesion to glass cloth, glass fibers and the like with good flexural strength and modulus.

Other objects and advantages will become apparent from the following description.

The proper adhesion of the resin to glass fibers and the like is essential to obtain maximum physical properties. The importance of improving physical properties cannot be overstressed, since this is a very important factor in the glass laminating industry. In accordance with the present invention, it is possible to increase the flexural strength of glass fiber laminates by more than 30%, by adding a polymer of vinyl imidazole to any of the commercially available unsaturated polyesters and any commercially available cross-linking agents. It is thus possible for laminates requiring a specified flexural strength to be now produced with fewer glass plies than previously required, and thereby reduce the weight of these laminates in the finished product, without reduction in strength. This possible reduction in weight is of prime importance, particularly in aircraft production.

We have discovered that polymerizable unsaturated polyester resins, when cross-linked with a monomer, and containing 1 to 25% by weight of a polymer of N-vinyl imidazole, yield resins having extremely high adhesion to glass cloth, glass fibers, glass sheets, and other structural materials fabricated from glass fibers or glass cloth as evidenced by greatly improved flexural strength and modulus even after prolonged water immersion.

The use of a polymer of N-vinyl imidazole and the obtainment of the improved properties, even after water immersion, is surprising and totally unexpected, since polyvinyl imidazole is water soluble, and unlike the cross-linking monomers, does not become an integral part of the final cured resin by chemical reaction.

The polyvinyl imidazole may be added to the unsaturated polyester resin solution prior to curing, or the polyvinyl imidazole may be coated onto the glass cloth, glass fibers, and the like, followed by addition of the unsaturated polyester resin and curing. The presence of the polymer of N-vinyl imidazole in the unsaturated polyester resin composition greatly improves the adhesion of the resin to glass in its various forms, such as glass cloth, glass fibers, glass sheets, etc.

The polymer of N-vinyl imidazole employed in accordance with the invention is characterized by the following general formula:

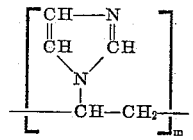

wherein $m$ represents the extent of polymerization and is characterized by a molecular weight ranging from 5,000 to 100,000.

Copolymers containing about 80% of N-vinyl imidazole and about 20% of other polymerizable monomer such as vinyl ester, styrene, vinyl toluene, acrylonitrile, methacrylonitrile, etc. can also be used.

It is to be noted at the outset that in the practice of our invention, the constitution of the polyesters is immaterial so long as they are of the unsaturated type. The art is replete with various literature and patent references on the preparation of such unsaturated polyester resins. In fact such unsaturated polyesters are commercially available under various brand and trade names. The simplest members of this group of resins are those produced by the condensation of $\alpha,\beta$-unsaturated organic acids with a polyhydric alcohol of either aliphatic or aromatic origin, preferably those containing primary hydroxyl groups.

As illustrative examples of the components entering the preparation of unsaturated polyesters which may be cross-linked, and to which a polymer or copolymer of N-vinyl imidazole may be added in accordance with our invention to give resins having the foregoing desirable characteristics, the following alcohols and acids are illustrative:

ALIPHATIC POLYHYDRIC ALCOHOLS

Ethylene glycol
Propylene glycol
Trimethylene glycol
Triethylene glycol
Pentaethylene glycol
Polyethylene glycol
1,4-butanediol
Diethylene glycol
Dipropylene glycol
2,2-dimethyl-1,3-propanediol
Hexamethylene glycol

AROMATIC POLYHYDRIC ALCOHOLS

Xylylene alcohols
Resorcinol bis hydroxy ethyl ether
Resorcinol bis hydroxy propyl ether
Dimethylol toluene
Dimethylol xylene 4,4'-isopropylidene bis phenol, dihydroxy ethyl ether
4,4'-isopropylidene bis phenol, dihydroxy propyl ether

UNSATURATED DIBASIC ACIDS AND ANHYDRIDES

| | |
|---|---|
| Maleic acid | Fumaric acid |
| Ethyl maleic acid | Aconitic acid |
| Maleic anhydride | Mesaconic acid |
| Muconic acid | Itaconic acid |

SATURATED DIBASIC ACIDS

| | |
|---|---|
| Adipic acid | Succinic acid |
| Azelaic acid | Malic acid |
| Sebacic acid | Citric acid |
| Dodecyl succinic acid | |

In addition to the foregoing acids, phthalic anhydride and tetrachlorphthalic anhydride may also be employed.

The polyesters preferred in accordance with the invention are those that are obtained by esterifying an unsaturated polybasic acid with a polyhydric alcohol. A part of the unsaturated polybasic acid may be replaced by a saturated polybasic acid. In other words, a mixture of unsaturated and saturated polycarboxylic acids will form an unsaturated polyester amenable to cross-linking with various monomers and amenable to the incorporation of a polymer of N-vinyl imidazole.

The proportions of the unsaturated polybasic acids, or mixtures of saturated and unsaturated polycarboxylic acid with polyhydric alcohols are not critical, and the proportions may be varied to any extent as long as a resinous unsaturated polyester, preferably having an acid number below 60, is obtained. Polyesters having an acid number between 5 and 50 are, however, preferred.

Illustrative examples of the ratios of polybasic acid and polyhydric alcohol which, when esterified will yield an unsaturated resinous product having the desired acid number are as follows:

1

| | Moles |
|---|---|
| Maleic anhydride | 15.0 |
| Ethylene glycol | 16.5 |

2

| | |
|---|---|
| Maleic anhydride | 10.0 |
| Diethylene glycol | 11.0 |

Polyesters prepared from mixtures of dibasic acids and mixture of glycols:

1

| | Moles |
|---|---|
| Maleic anhydride | 7.5 |
| Phthalic anhydride | 2.5 |
| Ethylene glycol | 2.75 |
| Diethylene glycol | 8.25 |

2

| | |
|---|---|
| Maleic anhydride | 6.25 |
| Phthalic anhydride | 3.75 |
| Ethylene glycol | 5.25 |
| Diethylene glycol | 5.25 |

3

| | |
|---|---|
| Fumaric acid | 4.0 |
| Phthalic anhydride | 8.0 |
| Ethylene glycol | 12.6 |
| Pentaerythritol | 0.15 |

4

| | |
|---|---|
| Maleic acid | 10.0 |
| Ethylene glycol | 6.0 |
| Isopropylidene bis-(p-phenylene-oxy-propanol-2) | 4.5 |

The foregoing formulations are condensed by the usual polyester condensation procedure until the acid number is below 50. The reaction mixture is then cooled and an inhibitor such as hydroquinone, resorcinol, aniline, benzaldehyde and the like added. The amount may range in the order of 0.1 to 10% by weight of the unsaturated polyester resin.

The proportion of monomer employed as a cross-linking agent may range from 1 to 60% by weight of the unsaturated polyester resin. Such monomers or cross-linking agents include all polymerizable monomers, such as, for example, styrene, α-methylstyrene, methyl methacrylate, isopropyl methacrylate, n-butyl methacrylate, methyl acrylate, ethyl acrylate, n-propyl acrylate, butyl acrylate, acrylonitrile, methacrylonitrile, acrylamide, methacrylamide, N-n-butyl acrylamide, methyl vinyl ether, isopropyl vinyl ether, etc.

During the course of experimentation of our invention with the foregoing cross-linking polymerizable monomers, we found that employed by themselves (without the presence of polymeric N-vinyl imidazole) in combination with unsaturated polyester, the average flexural strength (dry) is around 30,000 and the modulus (dry) is around 900,000. However, when such polyester resin mixture contains 5 to 30% by weight of polymeric N-vinyl imidazole the flexural strength, both dry and wet increases considerably. In view of this finding we have concluded that the nature or character of the cross-linking polymerizable monomer is immaterial so long as the monomer contains the aforementioned group.

The polymer of N-vinyl imidazole may be added to the unsaturated polyester resin mixture (containing 40–45% by weight of the unsaturated polyester resin and 55–60% by weight of any one of the above listed cross-linking polymerizable vinyl monomers) prior to curing in amounts of 5 to 30% by weight of the resin mixture. It may also be coated on the glass material in the proper concentration followed by addition of the polyester resin and curing. In either case, good overall results are obtained.

The unsaturated polyester resin containing the cross-linking agent or mixtures thereof may be cured by the addition of the usual catalyst which includes organic peroxides, peracids, and the like.

In addition to the foregoing catalysts, accelerators such as dimethyl aniline and diethyl aniline or any other suitable catalyst known to the art may be employed to increase the effect of the catalyst in the unsaturated polyester resin. The quantity of accelerator may range from 0.1 to 5% by weight of the polyester resin.

The unsaturated polyesters prepared as above, or those which are commercially available may, after the addition of cross-linking monomer in the ratio of 40–45% by weight of the polyester resin to 60–55% by weight of the monomer together with 5 to 30% by weight of the polyester resin mixture of polymeric N-vinyl imidazole, catalyst, accelerator, filler and the like, are employed in coating, laminating or molding operations in accordance with established techniques.

By the incorporation of the polymer of N-vinyl imidazole, in concentrations of 5 to 30% by weight of the polyester resin mixture, it is possible to produce a final product with the same strength characteristics, but at reduced wall thickness, thereby resulting in appreciable weight saving. In structural applications, such as automobile bodies, luggage and the like, the increased flexural strength resulting from the use of polyvinyl imidazole permits the use of thinner laminates, resulting in weight reductions coupled with reduced cost.

The following examples will illustrate the manner in which the present invention may be practiced. All parts are given by weight.

*Example 1*

Into a 5-liter 3-necked flask equipped with a stirrer and thermometer, condenser and dropping funnel (assembled as in the conventional azeotropic process) 6 moles of ethylene glycol were charged, agitation started, and a slow stream of nitrogen gas introduced. The flask was heated to 100° C. and 4.5 moles of isopropylidene bis-(-p-phenylene-oxypropanol-2) added, followed by 10 moles of maleic anhydride. The trap adjacent to the reflux condenser was filled with xylene, and additional xylene slowly added, totaling about 5% of the original charge. The temperature was increased to about 150° C. in about one hour and reflux established. The temperature was raised gradually during 2 hours until 190° C. has been reached. Thereafter the temperature was held at 190° C. until the acid number was below 50. The trap was emptied, and vacuum applied to remove xylene. The vacuum was maintained until the acid number was about 35. The polyester thus obtained was dissolved in styrene in a ratio of 45% by weight of polyester resin and 55% by weight of styrene.

To 100 parts of the resulting polyester resin solution one part by weight of the benzoyl peroxide was added, and laminates prepared by impregnating and laying up one by one 20 layers of No. 181 Volan glass fabric 12" x 12", using the solution, in a wooden frame, ¼" thick. The laminates were cured in an oven between plate glass panels, using mylar separators, overnight at 60° C. The oven temperature was then raised to 120° C. during one hour, and the laminates removed from the oven after an additional hour at 120° C. The average physical characteristics of the laminates obtained are as follows:

AVERAGE FLEXURAL STRENGTH
[ASTM D-790-49T]
Dry _____ 30,725
Wet _____ 26,250

MODULUS
Dry _____ 990,000
Wet _____ 650,000

*Example II*

Twenty layers of No. 181 Volan glass fabric 12" x 12" were separately coated with 5% aqueous polyvinyl imidazole (M.W. about 26,000) solution, so that the weight deposited is 5% of dry polyvinylimidazole based on the weight of the glass fabric.

The cloth was then coated with the polyester, styrene, benzoyl peroxide solution of Example I, and worked up as before. The physical characteristics of the laminates obtained are as follows:

AVERAGE FLEXURAL STRENGTH
[ASTM D-790-49T]
Dry _____ 42,300
Wet _____ 42,000

MODULUS
Dry _____ 1,483,500
Wet _____ 1,435,500

*Example III*

To the polyester, styrene and benzoyl peroxide solution of Example I, 5 parts by weight of polyvinyl imidazole (M.W. about 12,000) was added as a 30% solution in ethanol. The ethanol was flashed off and laminates prepared as in Example I. The physical characteristics of the laminates obtained are as follows:

AVERAGE FLEXURAL STRENGTH
[ASTM D-790-49T]
Dry _____ 42,000
Wet _____ 42,100

MODULUS
Dry _____ 1,420,000
Wet _____ 1,426,500

*Example IV*

A polyester resin solution similar to that of Example I was prepared in which the styrene was replaced by an equivalent amount of methyl methacrylate. The resulting polyester resin was divided into two portions. Laminates were prepared from the first portion and cured as in Example I. The physical characteristics of the laminates obtained are as follows:

AVERAGE FLEXURAL STRENGTH
[ASTM D-790-49T]
Dry _____ 22,900
Wet _____ 19,750

MODULUS
Dry _____ 921,500
Wet _____ 585,000

To 100 parts of the second portion of the polyester resin, there were added 100 parts of a 30% solution of poly N-vinyl imidazole (M.W. about 16,000) dissolved in equal parts of acetone and alcohol. Laminates were prepared and cured as in Example I with the following results:

AVERAGE FLEXURAL STRENGTH
[ASTM D-790-49T]
Dry _____ 25,900
Wet _____ 23,800

MODULUS
Dry _____ 980,000
Wet _____ 760,000

*Example V*

Example II was repeated with the exception that the polyester resin solution of Example I was replaced by an equivalent amount of a polyester resin obtained by condensing 6.25 moles of maleic anhydride and 3.75 moles of phthalic anhydride with 5.25 moles of ethylene glycol and 5.25 moles of diethylene glycol. The resulting polyester resin has an acid number of 45. The polyester was dissolved in vinyl toluene in a ratio of 45% by weight of polyester and 55% by weight of vinyl toluene and divided into two portions. After laminating and curing the first portion as in Example I, the following characteristics were observed:

AVERAGE FLEXURAL STRENGTH
[ASTM D-790-49T]
Dry _____ 24,280
Wet _____ 18,600

MODULUS
Dry _____ 650,000
Wet _____ 450,000

To 100 parts of the second portion of the polyester resin, there were added 100 parts of a 30% solution of poly N-vinyl imidazole (M.W. about 18,000) dissolved in equal parts of acetone and alcohol. Laminates were prepared and cured as in Example I with the following results:

AVERAGE FLEXURAL STRENGTH
[ASTM D-790-49T]
Dry _____ 28,000
Wet _____ 25,800

MODULUS
Dry _____ 875,000
Wet _____ 750,000

We claim:
1. A thermosetting composition of matter for bonding glass and fibrous glass material comprising a resinous mixture of 40–45% by weight of an unsaturated polyester resin of a polycarboxylic acid and a polyhydric alcohol and 60–55% by weight of a polymerizable monomer selected from the class consisting of styrene, α-methyl styrene, methyl methacrylate, isopropyl methacrylate, n-butyl methacrylate, methyl acrylate, ethyl acrylate, n-propyl acrylate, butyl acrylate, acrylonitrile, methacrylonitrile, acrylamide, methacrylamide, N-n-butyl acrylamide, methyl vinyl ether, isopropyl vinyl ether and isopropyl vinyl ether, said resinous mixture containing from 5 to 30% by weight thereof of a homopolymer of N-vinyl imidazole.

2. A thermosetting composition according to claim 1 wherein the unsaturated polyester has an acid number of from 5 to 50.

3. A thermosetting composition according to claim 1 wherein the homopolymer of N-vinyl imidazole has a molecular weight ranging from 5,000 to 100,000.

4. A process of bonding glass and fibrous glass material which comprises treating said material with a thermosetting resinous mixture comprising 40–45% by weight of an unsaturated polyester resin of a polycarboxylic acid and a polyhydric alcohol and 60–55% by weight of a polymerizable monomer selected from the class consisting of styrene, α-methylstyrene, methyl methacrylate, isopropyl methacrylate, n-butyl methacrylate, methyl acrylate, ethyl acrylate, n-propyl acrylate, butyl acrylate, acrylonitrile, methacrylonitrile, acrylamide, methacrylamide, N-n-butyl acrylamide, methyl vinyl ether, isopropyl vinyl ether and isopropyl vinyl ether, said resinous mixture containing from 5 to 30% by weight thereof of a homopolymer of N-vinyl imidazole, and heating the treated material to a temperature of 60–120° C. for a period of time sufficient to yield a laminate of said material and thermosetting resinous mixture.

5. The process according to claim 4 wherein the unsaturated polyester has an acid number of from 5 to 50.

6. The process according to claim 4 wherein the homopolymer of N-vinyl imidazole has a molecular weight ranging from 5,000 to 100,000.

References Cited in the file of this patent

UNITED STATES PATENTS

| | | |
|---|---|---|
| 2,534,617 | Mohrman | Dec. 19, 1950 |
| 2,603,621 | Craig et al. | July 15, 1952 |
| 2,744,044 | Toulmin | May 1, 1956 |
| 2,831,836 | Forchielli | Apr. 22, 1958 |